United States Patent Office 3,097,097
Patented July 9, 1963

3,097,097
PHOTO DEGRADING OF GEL SYSTEMS AND PHOTOGRAPHIC PRODUCTION OF RELIEFS THEREWITH
Gisela K. Oster and Gerald Oster, both of 36 Grove St., New York, N.Y.
No Drawing. Filed Feb. 12, 1959, Ser. No. 792,699
29 Claims. (Cl. 96—35)

This invention relates to the photo degrading of gel systems.

The invention and its objects will become apparent from the following description:

In accordance with the invention, we discovered that certain gel systems consisting of substantially linear high polymers cross-linked into the form of a gel by metal ions will degrade, i.e. will lose their rigidity; become degelled; become liquefied; or become more soluble when irradiated with visible light if the same contains a photo-reducible dye and a material incapable of reducing the dye in the absence of light able to reduce the photo-excited dye.

The starting gel may be formed from any substantially linear high polymeric material capable of being cross-linked in the form of a gel by metallic ions, as for example polyacrylamide cross-linked with ferric ions, mercuric ions, or cupric ions; polyvinyl alcohol cross-linked with titanic, stannate, molybdate ions, and the like.

The modular weight of the polymer is not critical, and it is merely necessary that the same be large enough so that it is capable of being physically converted into the form of a gel by the cross-linking metal ions. In general, the same should have a molecular weight of about ten thousand to ten million, preferably at least fifty thousand. Similarly, the amount of metal ions is not critical, and it is only necessary that same be present in amounts sufficient to form a gel of the desired mechanical rigidity. The minimum quantity of metal ions for this purpose is generally desirable and ideally each two molecules of the polymer should be cross-linked by a single metal ion forming a continuous network for the reasons explained hereinafter.

The gel is formed from a solution of the polymer in a solvent which will also dissolve a salt of the metal to be used as a cross-linking agent and in which photo-reduction of the photo-reducible dye may occur. This solvent is preferably an aqueous solvent. The gel is formed by gelling the solution in any conventional manner, and may be formed by increasing the pH of a polyacrylamide solution containing a mercuric salt, as for example, by contacting the same with ammonia vapors; by baking a solution of a polymer containing a metal salt, as for example, polyvinyl alcohol containing titanic lactate and the like.

Many of these gels formed from high polymers cross-linked with metal ions are known and described in the literature of the art as is the method for their production.

The term, "cross-linking" as used in connection with the metal ion is used in its broadest sense to indicate the bonding or holding together two adjacent linear polymer molecules by the metal ion and it is intended to include a complexing or chelating effect. The metal ions which would cause this effect are most commonly di- or polyvalent. Mono-valent metal ions, such as Ag+ may also be used provided that they are capable of forming a di-co-ordinate bond.

The starting solution from which the gel is formed should also contain the photo-reducible dye and the material for reducing the photo-excited dye.

The dyes which may be used in accordance with the invention comprise any known dyes which are capable of forming a stable system with the reduction material in the absence of light, but which will undergo reduction when irradiated with visible light in the presence of the reduction material. These dyes include: rose bengal, phloxine, erythrosine, eosin, fluorescein, acriflavine, thionine, riboflavin, water-soluble and fat-soluble chlorophylls, hematoporphyrin, proflavine, methylene blue, etc. The dyes thus include member of the fluorescein family, the thiazine family, and certain acridines and porphyrins. A large number of these dyes are characterized by their fluorescence.

The material which will reduce the photo-excited dye but yet will form a stable system with the dye in the absence of light is actually believed to be an electron donor or hydrogen donor, but will be referred to herein as a reducing agent, as its ultimate purpose is reduction of the dye. Any known reducing agent or material which, in combination with the particular dye in question, will form a stable system, in the absence of light, but which will cause reduction of the dye upon irradition with visible light, may be used. The reduction potential of the reducing agent should, therefore, be less than that necessary to reduce the particular dye in question in the absence of visible light. These reducing agents include, for example, stannous chloride, ascorbic acid, glutathione, hydroxylamine, hydrazine, phenylhydrazine, dichlorophenylhydrazine, thiourea, allyl thiourea, and the like. Additionally included in this group are materials which are not normally considered as reducing agents in that they normally show no reducing power, but which are capable of reducing the photo-excited dye and thus are reducing agents within the scope of the invention. These materials include chelating agents, such as triethylanolamine, hydroxyethylenediamine, bis (hydroxy ethyl) glycine, secondary or tertiary amine chelating agent, oxalic acid, and the like. The reducing agent must, of course, be incapable of reducing the metal ions forming the gel per se. Otherwise the mere addition thereof would cause a collapse of the gel or initially prevent its formation. When using metal ions, which are readily reduced for this purpose, as for example, ferric ions, it is necessary to use a reducing agent which normally has no reducing power, as for example, triethylanolamine, or other chelating agents.

The system of the dye and reducing agent, which are stable in the dark, but undergo reduction of the dye upon exposure to light are known and are, for example, described in United States Patent 2,850,445.

The dye and reducing agent are preferably added to the solution from which the gel is formed. The amount of dye and reducing agent is not critical but should be sufficient to degrade, i.e. break the gel to the desired degree upon illumination.

In principle, each molecule of photo-reduced dye will, in turn, reduce a metal ion forming the gel, be regenerated thereby, be further reduced, and so on, so that theoretically only a small amount of dye with respect to the metal ions need be present.

An excess of dye, however, is not detrimental and is often desirable. A stoichiometric amount of reducing agent is theoretically required with respect to the metal ions but there is no harm in having a smaller amount though an excess of reducing agent is desirable for practical operation. With an excess of reducing agent, there is an assurance that all of the dye and regenerated dye required to reduce the metallic ions will be photo-reduced upon being irradiated with visible light whereas if there is a smaller amount of reducing agent only the amount of dye which is photo-reduced can act to cause the degradation of the gel.

With a relatively small amount of metal ions cross-linking the polymer forming the gel, as for example, one metal ion cross-linking each two adjacent polymer molecules, a very rapid degelling upon the absorption of a small quantity of light by the dye will occur so that there will be a very high apparent quantum yield. In such a system the degelling may be effected with a short exposure to low intensity light.

Very surprisingly, the degradation of the gel is a completely localized effect and only the light-struck areas will be degraded with the degradation occurring in proportion to the intensity. The photo-degradation of the gel system, in accordance with the invention, is thus excellently suited for photo-reproduction. If the gel, as for example in the form of a flat surface on a backing, is irradiated with a visible light image, the degraded, as for example, collapsed portion of the gel, will correspond exactly to this image. The light source used may be any light source producing light within the visible range, i.e. having a wave length between about 400 and 760 millimicrons. Actually, it is only necessary to irradiate with a wave length which the particular dye absorbs. Since by very definition the dye is a colored substance, this wave length will always be in the visible light range.

Upon exposure of a flat surface of the gel, as for example, on a backing, such as a backing of paper, glass, plastic, metal, or the like, to a visible light image, followed by removal, as for example, by a wiping off or a washing out of the degraded, such as collapsed, portion of the gel, a reproduction of the image is directly formed. Thus, if the gel is on a white background and contains a combination of dyes which will absorb all wave lengths, and thus look black, or additionally incorporate a black pigment, the light-struck areas will degrade and when removed will expose the white background whereas the unlight-struck portion will remain black, leaving a true positive image, as for example, for direct photography. The portions of the gel which have not been degraded, i.e. which have not been exposed to the light may be fixed in various manners, as for example, by drying the same to an insoluble solid mass, as for example, by baking, by cross-linking the same, using, for example, conventional cross-linking agents, such as difunctional compounds and the like, by coating the same with a suitable plastic or lacquer or the like; by baking with formaldehyde etc.

Similarly the gel may be used for a transfer process with a transfer dye or pigment being incorporated in the gel or behind the same. Upon collapse of the gel in the light-struck area, the dye will be released from the gel or is free to pass through the gel and thus may be transferred to another backing sheet such as a paper sheet.

In a similar manner the gel may be used in a silk screen or mimeographing type process. In this connection an ink permeable sheet, such as a silk screen or mimeograph tissue, is coated or impregnated with the gel, rendering the same impermeable. After illumination with a visible light image, the light-struck areas of the gel will collapse, causing these areas to be ink permeable. Ink may be pressed through in the conventional manner.

The irradiation with the visible light image is an irradiation with visible light having variations in intensity corresponding to the image to be reproduced. This may be effected in any known or desired manner for forming a light image, as for example, by irradiating with visible light, through a photographic positive or negative transparency, by projecting a transparency or reflected image, or by passing light through a translucent printed or typewritten sheet, or by directly producing an image with a lens and the like.

In the case of photo-sensitive gels, which are intended for photographic use, and which should have a broad color sensitivity, at least three photo-reducible dyes should be incorporated in the gel, each having an absorption maximum for a different one of the primary colors. Thus, for example, acriflavine, rose bengal, and methylene blue may be used as the dyes.

The gels, in accordance with the invention, are excellently suited for color photography or color reproduction by either a subtractive or direct process. For subtractive color reproduction, a three-plate system may be used, each plate containing a dye which absorbs a different one of the primary colors. The plates should be on a transparent backing, and one for example, may contain acriflavine, the other rose bengal, and the third methylene blue, as the dye material. Each of the plates is exposed to the same positive color image, as for example, in a standard one-shot, three-color camera, or any other desired manner. This will, for example, cause the gel on the red-sensitive plate to collapse at the areas struck by red light, the gel of the blue-sensitive plate to collapse in the areas struck by the blue light, and the gel of the green-sensitive plate to collapse in the areas struck by the green light. The collapsed portions of the gel may then be washed from the plates, and these portions filled in by correspondingly colored pigments or dyes, and these colored dyes or pigments fixed in place by a suitable binder. Thereafter the plates may be exposed to ordinary white light, causing the remaining portions of the gel to collapse which will wash out leaving only the filled in colors. Thereafter the plates may be superimposed forming the colored picture.

If, in place of the plates, the color sensitive gels are used to coat or impregnate three separate ink-permeable sheets, such as stencil sheets or silk screens, after the exposures and washing out of the collapsed portions, it is merely necessary to press corresponding colored inks or dyes through the sheet on to a backing in the manner of the conventional silk screen process.

The gel may also be used for a direct color process. For this purpose a three-layer laminate may be made up containing three layers of gel, each containing a different photo-reducible dye. Thus, one of the layers may contain a yellow dye, such as proflavine, or fluorescein, another layer a magenta dye, such as rose bengal, or erythrosin, and the third a cyan dye, such as methylene blue or azure C. The layers may additionally contain corresponding pigments to give a better appearance. Upon exposure to a positive color image, the color image will be directly produced after washing out the collapsed portions of the gel.

In order to produce a printing matrix of the relief type, the starting photo-sensitive gel may be placed on a suitable backing as for example a copper plate in the form of a thin film. The plate may then be illuminated with a positive image, as for example a photographic positive by projection. Degradation, such as breaking the gel, occurs at the illuminated areas, which are then removed by washing. The remaining portions of the gel may be set and hardened, as for example, by cross-linking with formaldehyde, under the influence of heat, leaving the same in the form of a raised image. After the hardening, the plate may be inked in the conventional manner and used for printing or lithography.

It is also possible to produce an etched plate in a similar manner. For this purpose the starting gel is used to coat a suitable etching plate, such as an aluminum plate. After exposure with a positive image, the collapsed gel at the light-struck areas is washed away, exposing the plate, which is then subjected to etching with a suitable etching solution, as for example, an alkali solution. The plate will, of course, be protected from the etching at the areas which have not been light struck, and which are thus still covered and protected by the gel. After the etching process and removal of the remainder of the gel, the plate may be used for offset printing in the conventional manner. By using three plates each coated with a gel containing a photo-reducible dye sensitive to a different primary color, and by inking the plates after the etching, with the corresponding colors, color printing may be achieved.

If the plate, covered with the gel, in accordance with the invention, is illuminated with a negative image, an intaglio plate may be made after washing of the degraded portions of the gel and setting the remaining portions, or after washing out the degraded portion and etching the backing plate. The intaglio plate may be used as a mold for a raised printing matrix in the conventional manner.

The selective degrading of the light struck areas of the gels in accordance with the invention may also be used for any other photo reproduction process or photo reproduction type process. Thus, for example, the same may be used for the production of printed circuits and may be used for any of the processes described in co-pending applications, Serials Numbers 482,868, filed January 19, 1955, and 531,284, filed August 29, 1955, keeping in mind, however, that the process is somewhat the reverse of that described in the co-pending applications, in that, in accordance with the invention, the gel collapses at the light-struck areas, whereas in the pending applications, the polymer is formed at the light-struck area.

The gel, in accordance with the invention, may also be converted into a finely divided form, as for example, by grinding and each particle will act as a small capsule which will collapse releasing its contents upon being struck by light which is absorbed by the photo-reducible dye contained therein. Each of these small, so to speak, capsules may be provided with a chemical reactant, a coupler, a separate dye, or pigment, or the like, and thus may be used for a photo-reproduction process. The particles may, for example, be distributed on a suitable backing in the form of a layer, the individual particles or capsules in the light struck area releasing the particular dye or reactant. This dye or reactant may be removed in the direct color type process or may be transferred to another backing or to the same backing for reaction or image transfer of an indirect, offset type process.

The gel systems and the degrading thereof in accordance with the invention find other uses in addition to photo-reproduction. The gels, for example, may be used with a light-actuated release device. Thus, for example, two glass plates may be bonded together with the gel and upon exposure to visible light, the gel will immediately degrade and collapse releasing the plates. If the bond between the glass plates is used, for example to hold spring loaded contacts apart, upon release of the plates upon exposure to visible light, the contacts will close actuating a device for any desired purpose. Similarly, for example, chemical reactions may be initiated by light. Thus, for example, two reactants may be maintained isolated from one another in the gel and upon collapse of the gel when exposed to visible light, the reactants will flow together causing the reaction.

In accordance with a further feature of the invention, we have surprisingly discovered that the gel per se which does not contain the photo-reducible dye will degrade, i.e. collapse, liquefy, or increase in solubility, when exposed to ultra violet light, i.e. light having a wave length below about 400 millimicrons. The gel preferably still contains the reducing agent and most preferably one of the chelating agent type. Apparently, the ultra violet light has sufficient energy to reduce the metal ions cross-linking the polymer chains, thus causing a degrading of the gel. The gel which does not contain the photo-reducible dye may thus be used in the same manner for the same purposes as the gel containing the photo-reducible dye, including the uses described above, except the irradiation is effected with ultra-violet light rather than visible light. It, of course, would be impossible to make direct color reproductions in this manner. Color reproductions, however, may be made in a manner similar to the bichromate process, keeping in mind, however, that the ultraviolet light struck areas, in accordance with the invention are degelled whereas in the bichromate process the same are rendered insoluble so that a reverse type image would have to be used with respect to that used in the bichromate process.

The following examples are given by way of illustration and not limitation:

*Example 1*

The following solution was made up:

|   | Grams |
|---|---|
| (1) Polyacrylamide | 3 |
| (2) Triethanolamine which had been brought to pH 6.0 with hydrochloric acid | 1 |
| (3) Mercuric chloride | 0.1 |

Water added to 100 grams total.

The solution was poured on to an aluminum plate. On exposure to ammonia vapors for three minutes the solution (one-hundredth of an inch thick) is converted into a rigid gel. After exposure through a positive photographic transparency to a carbon arc lamp for five minutes the exposed regions of the gel have become liquid while the unexposed regions of the gel remain rigid. On treatment of the exposed plate to alkali (5% sodium hydroxide) etching of the aluminum in the exposed region results. The remaining gel is then removed with 0.1% acetic acid. A printing plate results whose inked image when impressed on to paper (or through an offset press) is an exact copy of the original photographic positive transparency. In place of triethanolamine such chelating agents as hydroxyethylenediamine, bis(hydroxyethyl) glycine (in general, secondary or tertiary amine chelating agents) and oxalic acid may be used with identical results.

*Example 2*

The following solution was made up:

|   | Grams |
|---|---|
| (1) Polyacrylamide which had been subjected to alkaline treatment with 1% sodium hydroxide at 25° C. for one-half hour and then brought to pH 5 with hydrochloric acid | 2 |
| (2) Ferric chloride | 1 |
| (3) Oxalic acid | 1 |

Water added to make up to 100 grams.

This solution was poured on to a white sheet of paper which had been coated with a black waxy (acetone soluble) pigment. The solution (0.01 cm. thick) was gelled by contact with ammonia vapors first to the pH level where the pH value equal 6.0.

A typewritten letter was placed in contact with the gel and illuminated with an intermediate pressure type L. L. Hanovia mercury lamp for one-half minute. The typewritten page was removed and the exposed sheet was washed with acetone. In those regions corresponding to the white portions of the original typewritten page, the gel had been liquefied and the acetone washed out the black pigment. On the other hand in the unexposed regions corresponding to the black portions of the orignal page, the gel remained and protected the pigment from attack by acetone. Hence a faithful copy of the original typewritten letter was obtained and this system thereby serves as an office copying method.

*Example 3*

The following solution was made up:

|   | Grams |
|---|---|
| Polyvinylalcohol | 5 |
| Titanium lactate | 0.1 |

Water to make up to 100 grams.

The solution was poured on to a polished aluminum plate to a thickness of about one-tenth of a centimeter and baked at 100° C. for 30 minutes. The cross-linked film thereby produced is insoluble in water. On this film is placed a photographic transparency, and illuminated for 3 minutes with a high pressure mercury arc lamp (GE H-6 lamp). The irradiated film is now washed with water and then with a mixture of gum arabic and phosphoric acid. The plate is now suitable for offset lithography. When, in addition, the initial solution of the above example contains any of the photo-reducible dyes previously mentioned in the specification, as for example rose bengal, phloxine, erythrosine, eosin, fluorescein, acriflavine, thionine, riboflavin, water-soluble and fat-soluble chlorophylls, hematoporphyrin, proflavine, methylene blue, or the like in amount about 0.1 of a gram, and any of the reducing agents previously mentioned in the specification, as for example, stannous chloride, ascorbic acid, glutathione, hydroxylamine, hydrazine phenylhydrazine, dichloropenylhydrazine, thiourea, allyl thiourea, secondary or tertiary amine chleating agents such as triethanolamine, hydroxyethylenediamine, bis (hydroxy ethyl) glycine, ethylenediamine, ethylenediamine tetracetic acid, or triacetic acid, diethylene-triamine-pentacetic acid, 1,2-diaminocyclohexane tetraacetic acid, hydroxyethyl tris(hydroxypropyl) ethylenediamine ammoniadiacetic acid, methylaminodiacetic acid, N-phenylglycine, oxalic acid and the like in amount of about 1 gram, the irradiation may be effected with visible light, as for example, with a 500 watt tungsten lamp for a duration of one minute and similar results will be obtained.

*Example 4*

To the solution of Example 1 was added 0.1 gram of eosin and the procedure was repeated. However, the system is now sensitive to visible (particularly blue-green light) and the carbon arc was replaced by a tungsten lamp and similar results were obtained. Similarly if methylene blue is added the system is sensitive to red light. Similarly blue light for proflavine. All three dyes may be used to give sensitivity to all (or any) parts of the visible spectrum.

*Example 5*

The following solution was made up:

|  | Grams |
|---|---|
| (1) Polyacrylamide which had been subjected to alkaline treatment with 1% sodium hydroxide at 25° for one half hour and then brought to pH 5 with hydrochloric acid | 2 |
| (2) Cupric sulphate | 0.01 |

The solution is used to wet a piece of silk cloth and then the cloth is dipped quickly into a borate buffer at pH 9.0. This latter treatment converts the solution into a gel.

The treated cloth is now illuminated with a medium pressure mercury lamp (GE AH–4) through a photographic negative transparency for five minutes and then washed with water. The resultant image serves a silk screen matrix in which the illuminated portions allow the ink to pass through.

*Example 6*

The solution of Example 1 was made up and divided into three parts. To one part was added 0.1 gram of proflavine (a yellow dye). To another part was added 0.1 gram of erythrosine (a magenta dye). To the third part was added 0.1 gram of methylene blue. Each solution was applied to transparent colorless cellophane films and then gelled by the ammonia treatment. The three colored films were then placed over each other (the order is immaterial, unlike conventional tripack). The "laminate" is then illuminated with a tungsten lamp (500 watts) through a photographic color positive transparency for two minutes. Then the system is washed briefly with a 0.01% solution of hydroquinone and a faithful reproduction of the original color transparency is obtained.

*Example 7*

The solution of Example 4 was used to coat a white piece of paper which had been previously moistened with a solution of 1-phenyl-3-methyl-5-pyrazolone sulfonic acid. The coating was gelled by ammonia treatment.

The treated paper was now illuminated in a microfilm enlarger using a tungsten light source, the microfilm being a negative. The illuminated paper was then washed with an aqueous solution of diethyl-p-phenylenediamine and a deep red positive enlarged image of the microfilm negative was obtained.

*Example 8*

A gel was made up as in Example 7 with 1% methylene blue. Another made with 1% rose bengal and another made with 1% proflavine. Each colored gel was ground up into a fine powder with average particle size about five microns. The three powders were mixed well and dusted on to a white piece of paper which had been freshly lacquered. The colored particles adhere to the lacquer and the combination of the three kinds of colored particles makes the paper appear black.

Now the paper is exposed to a colored image (3 minutes' exposure through a color transparency in a lantern slide projector). On contact with a blotter the exposed collapsed particles of color complementary to the incident colored light are removed by the blotter forming thereon a color negative and leaving a color print of the same colors as the original. The color print is "set" by coating the same with lacquer.

*Example 9*

The following solution was made up:

|  | Grams |
|---|---|
| Polyacrylamide | 10 |
| Silver nitrate | 0.1 |
| Methylene blue | 0.1 |
| Water to 100 grams. | |

The above fluid solution is applied with a brush to a piece of white paper. The coated paper is dipped into a 50% solution of triethanol amine in water and dried.

The paper is exposed to an image from a 500 watt slide projector for two minutes. A non-coated paper is applied over the exposed paper and silver metal (and degelled polymer) which is produced in the exposed areas is transferred to the non-coated paper to give a negative of the original. The original paper is then heated with formaldehyde. This reduces the complexed silver nitrate and cross-links or hardens the polyacrylamide at the same time. Thus one also obtains a photographic positive.

*Example 10*

A solution was made up of:

|  | Grams |
|---|---|
| Polyacrylamide | 3 |
| Triethanolamine which brought 1 gram to pH 6.0 with hydrochloric acid mercuric chloride | 0.1 |
| Water added to 100 grams total. | |

This fluid system is applied with a paint brush to a water absorbing untreated paper. On exposing the coated paper with ammonium vapor, the paper is rendered water repellent.

The polyacrylamide can be used in amounts of 1% to 80%.

Triethanolamine 0.01% to 10%. Mercuric chloride from 0.01% to 5%.

In place of triethanolamine any chelating agent such as ethylenediamine, tetraacetic acid, etc. may be used which prevents the formation of mercuric oxide when mercuric salts are brought to pH 8 or higher but will allow mercuric ion to coordinate with the polymer.

While the invention has been described in detail with reference to certain specific embodiments, various changes and modifications which fall within the spirit of the invention and scope of the appended claims will become apparent to the skilled artisan. The invention is, therefore, only intended to be limited by the appended claims or their equivalents wherein we have endeavored to claim all apparent novelty.

We claim:

1. A water-soluble polymer in an aqueous medium, said polymer being cross-linked into the form of a gel by metallic ions selected from the group consisting of ferric, mercuric, silver, cupric, titanic, stannate, and molybdate ions, said metallic ions being reducible to a lower valent state with destruction of the cross-linking bonds, said gel containing a dissolved photoreducible dye and a reducing agent incapable of reducing said metallic ions and incapable of reducing said dye in the absence of light but of sufficient strength to reduce the dye when photo-excited, said dye and reducing agent forming a stable system in the absence of light which undergoes reduction of the dye upon exposure to visible light, said dye and reducing agent being present in sufficient amount so that when irradiated with visible light, the reducing agent will reduce the dye and the reduced dye, in turn, will reduce at least a portion of said metallic ions to thereby degrade said gel.

2. Gel, according to claim 1, containing imbided aqueous media.

3. Gel, according to claim 2, in which said photo-reducible dye is a member selected from the group consisting of: rose bengal, phloxine, erythrosine, eosin, fluorescein, acriflavine, riboflavin, proflavine, azure C, water-soluble, and fat-soluble chlorophylls, and hematoporphyrin, and in which said reducing agent is a member selected from the group consisting of amine chelating agents, stannous chloride, oxalic acid, ascorbic acid, glutathione, hydroxylamine, hydrazine, phenyl hydrazine, dichlorophenyl hydrazine, thiourea, and allyl thiourea.

4. A gel, according to claim 1, in which the said polymer is polyacrylamide.

5. Gel, according to claim 4, in which said photo-reducible dye is a member selected from the group consisting of rose bengal, phloxine, erythrosine, eosin, fluorescein, acriflavine, riboflavin, proflavine, azure C, water-soluble, and fat-soluble chlorophylls, and hematoporphyrin and in which said reducing agent is a chelating agent.

6. Gel, according to claim 5, in which said reducing agent is triethanolamine.

7. A gel according to claim 1 in which said polymer is polyvinyl alcohol.

8. Gel according to claim 7 in which said photo-reducible dye is a member selected from the group consisting of: rose bengal, phloxine, erythrosine, eosine, fluorescein, acriflavine, riboflavin, proflavine, azure C, water-soluble, and fat soluble chlorophylls, and hematoporphyrin, and in which said reducing agent is a member selected from the group consisting of amine chelating agent oxalic acid, stannous chloride, ascorbic acid, glutathione, hydroxylamine, hydrazine, phenyl hydrazine, dichlorophenyl hydrazine, thiourea, and allyl thiourea.

9. A layer of the gel, according to claim 1, on a substantially flat backing.

10. The gel, according to claim 1, sealing the openings of an ink permeable backing sheet.

11. A method for degrading gels which comprises irradiating with visible light a water-soluble polymer in an aqueous medium, said polymer being cross-linked into the form of a gel by metallic ions selected from the group consisting of ferric, mercuric, silver, cupric, titanic, stannate, and molybdate ions, said metallic ions being reducible to a lower valent state with destruction of the cross-linking bonds, said gel containing a dissolved photoreducible dye and a reducing agent incapable of reducing said metallic ions and incapable of reducing said dye in the absence of light, but of sufficient strength to reduce the dye when photo-excited, said dye and reducing agent forming a stable system in the absence of light which undergoes reduction of the dye on exposure to visible light, said dye and reducing agent being present in sufficient amount so that when irradiated with visible light the dye will be reduced and the reduced dye, in turn, will reduce at least a portion of said metallic ions, said irradiation being effected for a duration and intensity sufficient to photoexcite said dye to cause reduction thereof and thereby degrade said gel.

12. A photo reproduction process which comprises irradiating with a visible light image a water-soluble polymer in aqueous media, said polymer being cross-linked into the form of a gel by metallic ions selected from the group consisting of ferric, mercuric, silver, cupric, titanic, stannate, and molybdate ions, said metallic ions being reducible to a lower valent state with destruction of the cross-linking bonds, said gel containing a dissolved photoreducible dye and a reducing agent incapable of reducing said metallic ions and incapable of reducing said dye in the absence of light but of sufficient strength to reduce the photo-excited dye, said dye and reducing agent forming a stable system in the absence of light, said dye and reducing agent being present in sufficient amount so that when irradiated with visible light, the dye will be reduced and the reduced dye, in turn, will reduce at least a portion of said metallic ions, said visible light image being of sufficient intensity and said irradiation being of sufficient duration to photo-excite at least a portion of said dye to thereby cause degradation of the light struck areas of said gel, and thereafter removing the degraded portions of the gel.

13. Process according to claim 12 in which said photo-reducible dye is a member selected from the group consisting of: rose bengal, phloxine, erythrosine, eosin, fluorescein, acriflavine, riboflavin, proflavine, azure C, water-soluble, and fat-soluble chlorophylls, and hemotoporphyrin, and in which said reducing agent is a member selected from the group consisting of triethanolamine, stannous chloride, ascorbic acid, glutathione, hydroxylamine, hydrazine, phenyl hydrazine, dichlorohydrazine, thiourea, and allyl thiourea.

14. Process according to claim 12 in which said polymer is polyacrylamide.

15. Process, according to claim 14, in which said photo-reducible dye is a member selected from the group consisting of rose bengal, phloxine, erythrosine, eosin, fluorescein, acriflavine, riboflavin, proflavine, azure C, water-soluble, and fat-soluble chlorophylls, and hematoporphyrin, and said reducing agent is a chelating agent.

16. Process according to claim 11 in which said polymer is polyvinyl alcohol.

17. Process, according to claim 16, in which said photo-reducible dye is a member selected from the group consisting of: rose bengal, phloxine, erythrosine, eosin, fluorescein, acriflavine, riboflavin, proflavine, azure C, water-soluble, and fat-soluble chlorophylls, and hematoporphyrin, and in which said reducing agent is a member selected from the group consisting of amine chelating agent, oxalic acid, stannous chloride, ascorbic acid, glutathione, hydroxylamine, hydrazine, phenyl hydrazine, dichlorophenyl hydrazine, thiourea, and allyl thiourea.

18. Process according to claim 12 in which at least three separate layers of said gel, each containing a different photo-reducible dye, sensitive to a different primary color are irradiated with the identical color photo image.

19. Process according to claim 18 in which said layers are superimposed during said irradiation with the color image.

20. The gel, according to claim 1, in the form of three superimposed layers, each layer containing a different photo-reducible dye sensitive to a different primary color.

21. Gel, according to claim 20, in which one of said layers contains a magenta dye, another of the layers a yellow dye, and the third layer a cyan dye.

22. Gel, according to claim 21, in which said magenta dye is rose bengal, said yellow dye proflavine, said cyan dye a member selected from the group consisting of azure C and methylene blue.

23. A photo-reproduction process which comprises irradiating with an ultra-violet light image a water-soluble polymer in an aqueous media, said polymer being cross-linked in the form of a gel by metallic ions selected from the group consisting of ferric, mercuric, silver, cupric, titanic, stannate, and molybdate ions, said metallic ions being reducible to a lower valent state with destruction of the cross-linking bonds, said ultra-violet light image being of an intensity and duration sufficient to reduce the metallic ions at the light struck area and thereby degrade the ultra-violet light struck areas of the gel, and removing the degraded portions of the gel.

24. Process according to claim 23 in which the gel contains a chelating agent.

25. Process according to claim 23 in which said polymer is polyacrylamide.

26. Process according to claim 25 in which said gel contains a chelating agent selected from the group consisting of triethanolamine, secondary and tertiary amine chelating agents, bis (hydroxyl ethyl) glycine, and oxalic acid.

27. Process according to claim 23 in which said polymer is polyvinyl alcohol.

28. Process for the production of a polyacrylamide gel which comprises admixing polyacrylamide and mercuric chloride in an aqueous solution containing a chelating agent selected from the group consisting of triethanolamine, ethylene diamine and tetra acetic acid which prevents the formation of mercuric oxide when mercuric salts are brought to a pH of at least 8, but which will allow mercuric ions to coordinate with said polyacrylamide, and thereafter increasing the pH of said solution in amount sufficient to form an insoluble gel by contact with ammonia vapor.

29. A gel produced by the process of claim 28.

References Cited in the file of this patent

UNITED STATES PATENTS

| | | |
|---|---|---|
| 2,045,080 | Hagedorn | June 23, 1936 |
| 2,132,671 | Bauer | Oct. 11, 1938 |
| 2,678,884 | Sloan | May 18, 1954 |
| 2,760,431 | Beatty | Aug. 28, 1956 |
| 2,772,159 | Elliott | Nov. 27, 1956 |
| 2,789,053 | Elliott | Apr. 16, 1957 |
| 2,875,047 | Oster | Feb. 24, 1959 |
| 2,892,712 | Plambeck | June 30, 1959 |